Nov. 13, 1951 W. E. OWEN 2,575,291
APPARATUS FOR BAKING BREAD AND SIMILAR FOOD PRODUCTS
Filed Feb. 28, 1950
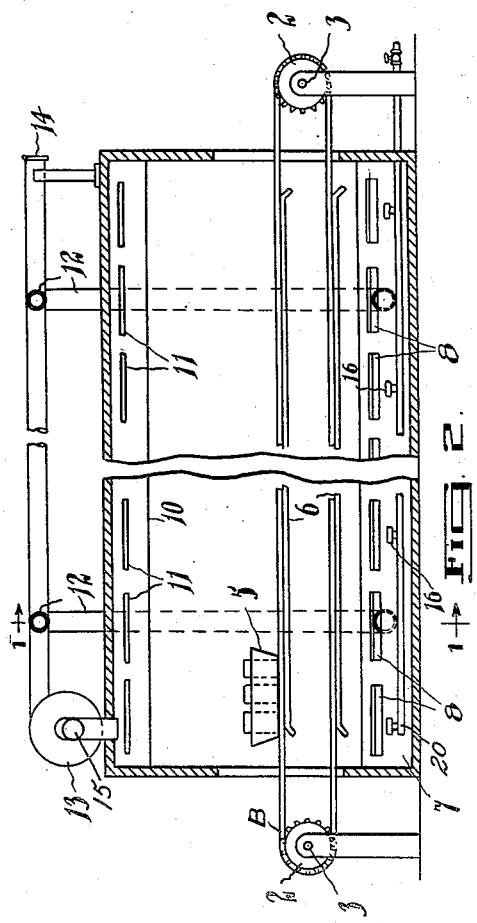
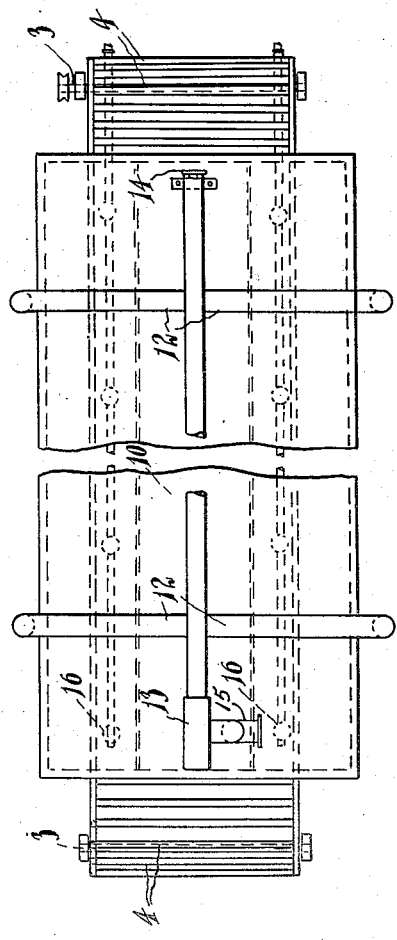
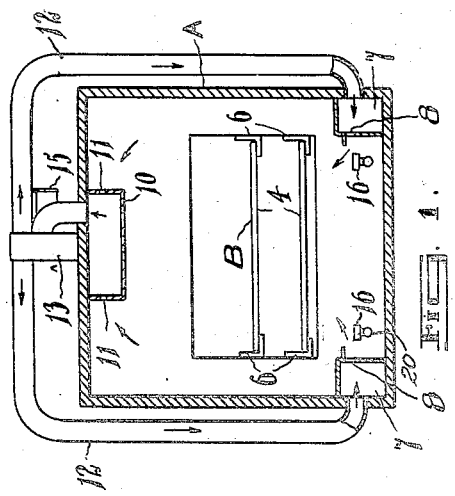
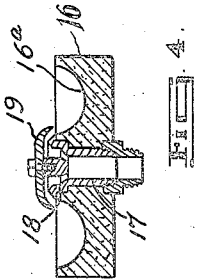
Inventor
W. E. Owen Patented Nov. 13, 1951

2,575,291

UNITED STATES PATENT OFFICE 2,575,291

APPARATUS FOR BAKING BREAD AND SIMILAR FOOD PRODUCTS

William E. Owen, Hamilton, Ontario, Canada

Application February 28, 1950, Serial No. 146,867

2 Claims. (Cl. 107—55)

This invention relates to a bake oven and the purpose of the invention is to devise an oven which will bake bread and similar food products more quickly than has hitherto been possible, and will at the same time produce a superior product.

It is well known that the use of burners which give off a large proportion of infra-red rays results in greater penetration of the object being heated, so that if a burner of this type is used for cooking purposes, the interior of the food product being cooked is heated more quickly than with what might be called conduction heat, and the baking period can therefore be reduced. However, the use of infra-red rays for cooking purposes is objectionable, inasmuch as the customary outer skin or crust is not formed on the product, and the cooking is so rapid that there is no browning of the outside surface. This is particularly undesirable in the case of the baking of bread, since the consumer demands a brown crust.

It has been proposed to bake bread in two stages, the first stage being done by the application of infra-red radiant heat, and the second stage being performed by the application of conducted heat, that is to say by the circulation of hot air around the bread, in order to provide a brown, outer crust after the original baking process has been completed. Such process is disclosed in United States Patent 2,340,354, F. H. Wells, dated February 1, 1944, but the apparatus disclosed in this patent is bulky and expensive and the time consumed is greater than in the modern, standard baking ovens in which a one and a half pound loaf of bread can be cooked in thirty-five to forty minutes. The baking speed contemplated in the present invention is in the neighborhood of sixteen minutes for the complete baking of a one and a half pound loaf.

According to the present invention, the source of heat is a plurality of so-called infra-red radiant type burners, arranged so that the infra-red rays will be directed to strike the pan or container in which the material being baked is contained or to directly strike the material itself.

Such a burner comprises a block or body of refractory material which is heated to a temperature of the order of 2,300° Fahrenheit by a mono-fuel which is preferably a controlled air-gas mixture. Such a burner gives off a large proportion of radiant heat, ranging from 25% to 30% of the total heat developed. In ordinary gas and electric burners there is considerably less radiant heat, that is to say nearly one hundred percent of the heat emanated is convection heat and the actual baking process is effected by the air surrounding the burner which is heated, and which in turn heats the dough or other material which is being cooked.

While the product could be baked substantially by the use of radiant rays from the burner, as stated above baked articles which have been baked by radiant heat alone are not acceptable, and the speed and efficiency which is the object of this invention would not be achieved. The convection heat would assist in the baking operation, but it has been found that the desired results are not obtained if natural circulation of this heat in the oven is relied upon. Therefore, it is part of the invention that a forced circulation of heating air is utilized. It has been found that proper distribution of the hot air is not obtained by forcing the air up from below the burner, as is common practice where burners requiring air for combustion purposes are used, since this tends to cool the refractory material of the burner and does not obtain an even concentration of heat, the heat being in such case directed towards the same place as the radiant rays, whereas it is desired to obtain a thorough circulation of the hot air which supplements the baking effect of the radiant rays.

According to the invention, therefore, the air in the oven is recirculated and it is injected into the oven through ducts above and across the upper face of the refractory material so that the convection heat generated by the burner is picked up and circulated through the oven, creating a uniform baking temperature. Since the radiant rays pass through the air without being absorbed thereby, this circulation of air does not interfere with the direct radiant heating of the material being cooked.

The foregoing features constituted the subject matter of my prior application, Serial No. 773,915 filed September 17, 1947, now abandoned. It is a further important feature of the invention that the inside oven walls are formed of highly polished heat reflecting material from which the radiant rays are reflected and ultimately directed to the article being heated.

The invention is hereinafter more particularly described and is illustrated by way of example in the accompanying specification in which:

Figure 1 is a cross section of the oven taken on the line 1—1 of Figure 2;

Figure 2 a vertical longitudinal section of the oven;

Figure 3 a horizontal longitudinal section of the oven;

Figure 4 a cross section of a suitable type of burner.

In the drawings like numerals of reference indicate corresponding parts in the different figures.

A indicates an oven, which is shown of oblong form, and from end to end of which extends an endless conveyor B. The conveyor in this case comprises a pair of endless chains 1, mounted on sprocket wheels 2, mounted on shafts 3, one or more of which shafts is positively driven by suitable means (which is not shown as it does not form part of the present invention).

Supported by the links of the chains 1, are cross bars 4. These cross bars are spaced apart longitudinally of the chains to provide air passages therebetween, but will be spaced closely enough together to properly support the pans 5 in which the dough from which the loaves are baked are placed. Usually these pans are arranged together in groups of three, the pans in each group being spaced apart to permit the passage of air between them.

The ends of the conveyor bars 4 are supported to maintain the conveyer horizontal by means of angle bars 6, which are supported in spaced relation to the side walls of the oven to permit a portion of the air to pass up between the angle bars and the walls.

Extending along each side of the oven at the bottom thereof is an air supply duct 7, each of which is provided with outlets in its inner face. These outlets are preferably arranged as a row of longitudinal slots 8, the material displaced in forming the slots being bent outwardly at the upper sides of the slots to form lips which guide the air passing out of the slots in a substantially horizontal direction.

At the top of the oven is an exhaust duct 10, having openings 11 therein to receive air from the upper part of the oven. The end of this exhaust duct 10 is connected by a pipe line 12 with the ends of the supply ducts 7. A fan 13, or similar device is provided in the pipe line 12 to provide positive circulation while an outlet 14 is provided for the exhaust of old air, and an inlet 15 for the inlet of fresh air when desired.

In front of each supply duct 7 is a row of burners 16 for burning gas or oil and a suitable burner of this type is shown in Figure 4. The burner illustrated is of the so-called "radiant" type and from 25% to 30% of the heat generated is radiant heat, about 99% of which is in the form of infra-red rays. The amount of radiant heat developed is approximately four times that developed by standard gas burners or electric heating elements and the expression "infra-red burner" when used in the specification and claims is intended to refer to a burner of this character.

As shown in Fig. 4, the burner includes a body or block 16, of porous refractory material baked at a temperature of 3,100° Fahrenheit to withstand a normal operating temperature of about 2,300° Fahrenheit indefinitely. The upper face of the block is provided with a concave annular groove 16a which may be termed the combustion bowl. Extending through the centre of the bowl is a thimble 17 at the end of which is formed an annular burner jet 18 having a baffle 19 above it adapted to direct the burning fuel into the bowl and thus heat the refractory body from the hot upper face of which the infra-rays emanate. Connected to the lower end of the thimble is a fuel inlet pipe 20 for carrying monofuel, that is a fuel which is premixed with sufficient oxygen to support combustion. In practice this monofuel is a mixture of a suitable hydrocarbon gas and air.

These burners are arranged so that the combustion bowls are slightly below the discharge slots 8 and the bowls are directed towards the conveyor so that a large proportion of the infra-red rays will strike the under side of the baking pans carried by the conveyor. The conveyor is positioned in the oven so that the baking pans carried thereby are close to the burners.

It will be seen that the air entering the oven through the slots 8 from the ducts 7 passes transversely of the oven over the burners, where said air becomes heated and immediately moves upwardly through the conveyor cross bars and around the pans, to bake the dough therein into bread. It finally passes out through the outlet slots 11 and is recirculated through the ducts and again is injected into the oven through discharge slots 8.

The interior of the oven is generally of polished stainless steel, which forms a good reflecting surface for the rays of "radiant" heat directing them back into the oven where they repeatedly strike the pans or the top surface of the bread. This "bombardment" of the bread with infra-red rays considerably increases the baking speed.

The conveyor cross bars are narrow and well spaced so that they interfere little with the baking process. Moreover they become highly heated by the infra-red rays and their heat is conducted to the baking pans and from the baking pans to the bread. The surface of the cross bars may be black or dull or roughened to increase the absorption of the infra-red rays.

The drawing is more or less diagrammatic, and does not disclose details of construction which are not pertinent to the present invention. Where details are shown it is contemplated that changes may be made without departing from the spirit of the invention. For example, the oven shown is of continuous baking type in which the bread is carried by a conveyor, but the invention is equally adapted to "batch" baking in which the bread pans are supported on a rack or other support.

By the use of an oven in accordance with the invention described it is possible to bake a one and a half pound loaf of bread in approximately 16 minutes at a saving of 35% of the fuel costs of a standard oven. Moreover bread so baked loses nothing in flavour and consistency as compared with bread baked in a standard oven for 35 to 40 minutes. In fact, bread baked for 35 or 40 minutes becomes over-processed and loses some of the natural flavour which is retained by the oven of this invention.

What I claim as my invention is:

1. An oven having a baking chamber, a support in the baking chamber for pans of dough, a plurality of monofuel infra-red burners in the oven, each of said burners including a refractory body, a burner jet for directing burning fuel against a face of the refractory body to heat the face of said body to a temperature sufficiently high to produce a large proportion of infra-red rays, the said faces of the burners being directed towards the support whereby a large proportion of the infra-red rays emanating from the burners will strike the pans in which the dough is contained, and means for continuously circulating air through the baking chamber including ducts and a fan and air discharge openings arranged to direct air above and substantially transversely of the said faces of the refractory bodies between the support and the burners.

2. An oven having a baking chamber, a support in the baking chamber for pans of dough, a plurality of monofuel infra-red burners in the oven, each of said burners including a refractory body, a burner jet for directing burning fuel against a face of the refractory body to heat the face of said body to a temperature sufficiently high to produce a large proportion of infra-red rays the said faces of the burners being directed towards the support whereby a large proportion of the infra-red rays emanating from the burners will strike the pans in which the dough is contained, and means for continuously circulating air through the baking chamber including ducts and a fan and air discharge openings arranged to direct air above and substantially transversely of the said faces of the refractory bodies between the support and the burners, the face of the interior walls of the baking chamber being of a high, heat-reflecting character adapted to reflect a large proportion of infra-red rays.

WILLIAM E. OWEN.

REFERENCES CITED

The following references are of record in the file of this patent:

UNITED STATES PATENTS

| Number | Name | Date |
| --- | --- | --- |
| 2,146,428 | Hawkins et al. | Feb. 7, 1939 |
| 2,340,354 | Wells | Feb. 1, 1944 |
| 2,491,687 | Nutt | Dec. 20, 1949 |
| 2,504,110 | Davis et al. | Apr. 18, 1950 |